United States Patent [19]
Hita de la Torre et al.

[11] Patent Number: 5,533,028
[45] Date of Patent: Jul. 2, 1996

[54] COMMUNICATIONS SUBSYSTEM BETWEEN BASE STATIONS AND BASE STATION CONTROLLERS IN BURST COMMUNICATIONS SYSTEMS

[75] Inventors: Carlos Hita de la Torre; Francisco J. Escrihuela Langa; Francisco J. Martinez Garcia; Carlos H. Blanco, all of Madrid, Spain

[73] Assignee: Alcatel N.V., Rijswijk, Netherlands

[21] Appl. No.: 264,962

[22] Filed: Jun. 24, 1994

[30] Foreign Application Priority Data

Jun. 25, 1993 [ES] Spain ................................ 9301440

[51] Int. Cl.$^6$ ............................................. H04B 7/212
[52] U.S. Cl. ...................... 370/95.3; 370/110.1; 379/59
[58] Field of Search ............................. 370/95.1, 95.3, 370/79, 82, 83, 100.1, 110.1, 110.4, 111; 379/58, 59, 60, 63; 455/33.1, 53.1, 54.1, 54.2, 56.1; 371/49.1, 49.2

[56] References Cited

U.S. PATENT DOCUMENTS

| | | | |
|---|---|---|---|
| 3,922,496 | 11/1975 | Gabbard et al. | 370/95.3 |
| 4,517,669 | 5/1985 | Freeburg et al. | 370/82 |
| 5,199,031 | 3/1993 | Dahlin | 455/33.1 |
| 5,212,684 | 5/1993 | MacNamee et al. | 370/79 |
| 5,278,835 | 1/1994 | Ito et al. | 370/95.3 |
| 5,293,380 | 3/1994 | Kondo | 370/95.3 |
| 5,295,178 | 3/1994 | Nickel et al. | 370/110.4 |
| 5,369,637 | 11/1994 | Richardson et al. | 370/95.3 |

FOREIGN PATENT DOCUMENTS

| | | |
|---|---|---|
| 0168647 | 1/1986 | European Pat. Off. . |
| 0189822 | 8/1986 | European Pat. Off. . |

OTHER PUBLICATIONS

"Sistemas de Novilidad Local" by Lorenzo Martinez, published in the Revista Espanola de Electronica, May 1993, pp. 34–39. (no translation).
Communication and Transmission, vol. 14, No. 1. 1992, Paris, France. pp. 21–28, XP257949, J. Varin "Alcatel 9000, a paneuropean cellular radiotelephone system".

*Primary Examiner*—Wellington Chin
*Assistant Examiner*—Chau T. Nguyen
*Attorney, Agent, or Firm*—Ware, Fressola, Van Der Sluys & Adolphson

[57] ABSTRACT

A communications subsystem between base stations and base station controllers in burst communications system of the type that links a set of base stations (2) with a base station controller (1) by means of unidirectional transmission lines (10). These base stations communicate by radio with at least one mobile terminal (3) making use of time division multiple access techniques. Communications between any base station (2) and its base station controller (1) over unidirectional transmission lines (10) make use of a frame structure with the same bit rate as that of the radio link between the base stations (2) and the mobile terminals (3), and in which the assembly formed by the guard field and the synchronisation field is replaced by a reduced synchronisation field and a control field to carry out the interchange of control and/or signalling information between the base station (2) and its base station controller (1).

5 Claims, 1 Drawing Sheet

COMMUNICATIONS SUBSYSTEM BETWEEN BASE STATIONS AND BASE STATION CONTROLLERS IN BURST COMMUNICATIONS SYSTEMS

TECHNICAL FIELD

The invention concerns a communications subsystem between base stations, that form radio links with mobile terminals using TDMA procedures, and base station controllers; this communications subsystem being implemented by means of unidirectional transmission lines.

It is of special application in mobile systems and in cordless data transmission and telephony systems, like the DECT system (Digital European Cordless Telecommunications).

BACKGROUND OF THE INVENTION

In any communications structure for cellular telephony, it is well known how a set of base station are used to communicate by radio with the mobile terminals that form part of the system, these stations being connected to a base station controller which manages their operation.

This is explained in the article "Sistemas de Movilidad Local" by L. Martinez, published in the Revista Española de ElectroL. Martinez, published in the Revista Española de Electrónica, May 1993, pages 34–39.

In this publication various architectures are shown for cordless subscriber loops consisting of mobile terminals, base stations and various types of switches that perform the function of base station controller, for example the cordless private branch exchange of FIG. 6, page 37, which, in addition to being connected to base stations, also permits connection with standard and extended service telephone sets.

The connections between the private branch exchange and the base stations are made, as indicated on page 39 of the article mentioned, by means of twisted wire pairs over which data are transmitted at 2048 kb/s (CCITT Recommendation G-702).

Under these circumstances, although not stated in the article mentioned, there is a clear need for an interface conversion which implies the availability of associated subsystems for clock generation, temporary storage memories in which the read/write processes for transmission frequency conversion take place, which, in turn, produces a small delay that has to be taken into account, etc. As a result, the complexity of the equipment, its cost, and the delays produced in interface conversions that are made in the communications process between the private branch exchanges and the base stations increase considerably.

TECHNICAL PROBLEM TO BE OVERCOME

The technical problem to be overcome, consequently, consists in establishing communications between base stations and base station controllers without performing interface conversions.

SUMMARY OF THE INVENTION

The subsystem according to the invention is applicable at the communications interface between base stations and base station controllers in digital cordless communications systems that make use of time division multiple access techniques for access by the base stations to mobile terminals where the air interface is formed with a frame structure that includes a series of bursts which, in turn, comprise a guard field, a synchronisation field and an information field. These communications between the base stations and the base station controllers are constituted physically by means of unidirectional transmission lines.

This subsystem is characterised in that communications over these transmission lines make use of an interface with a frame that has the same bit rate as that of the frame of the air interface of the cordless communications system and its structure is also the same, however in this case the guard field and the synchronisation field are replaced by a reduced synchronisation field to perform the burst synchronisation in this line transmission and by a control field to perform the interchange of control information and/or signalling between the base station controller and the base stations.

The clock frequency corresponding to the bit rate used in communications between the base station controller and the actual base stations is generated in a single master clock incorporated in the base station controller.

It is also characterised in that the control field has a protection mechanism against line errors.

The control field includes, at least, two equal subfields, termed control subfields, in which the same control information is sent in duplicate, in a command area, plus one parity control bit for the detection of errors through parity checks, such that if both parity bits, each corresponding to a control subfield, are equal and, in addition, so too are the command areas, then it is considered that there have been no transmission errors. If only one of the parity bits is erroneous, then it is considered that the control subfield with the correct parity bit, is error-free. Finally if both parity bits are erroneous or if both are correct but the command areas are not equal, then an error message is generated to show that the information sent in the control field could not be recovered.

As a consequence of applying the subsystem of the invention, it is not necessary to use an interface that works at a different transmission frequency, which would require the use of many highly complicated, associated interface conversion circuits and the delays implicit in the actual conversion. As a consequence of this and due to the stabilities required in the clock signals, the fact that a single, high stability master clock is used for the set of base stations and their controller result in major financial savings.

This translates into an important reduction in complexity and costs, with additional delays are restricted to a very small value.

BRIEF DESCRIPTION OF THE DRAWING

Below is given a fuller description of the invention based on the following figures in which.

BEST MODE FOR CARRYING OUT THE INVENTION

Figure 1:
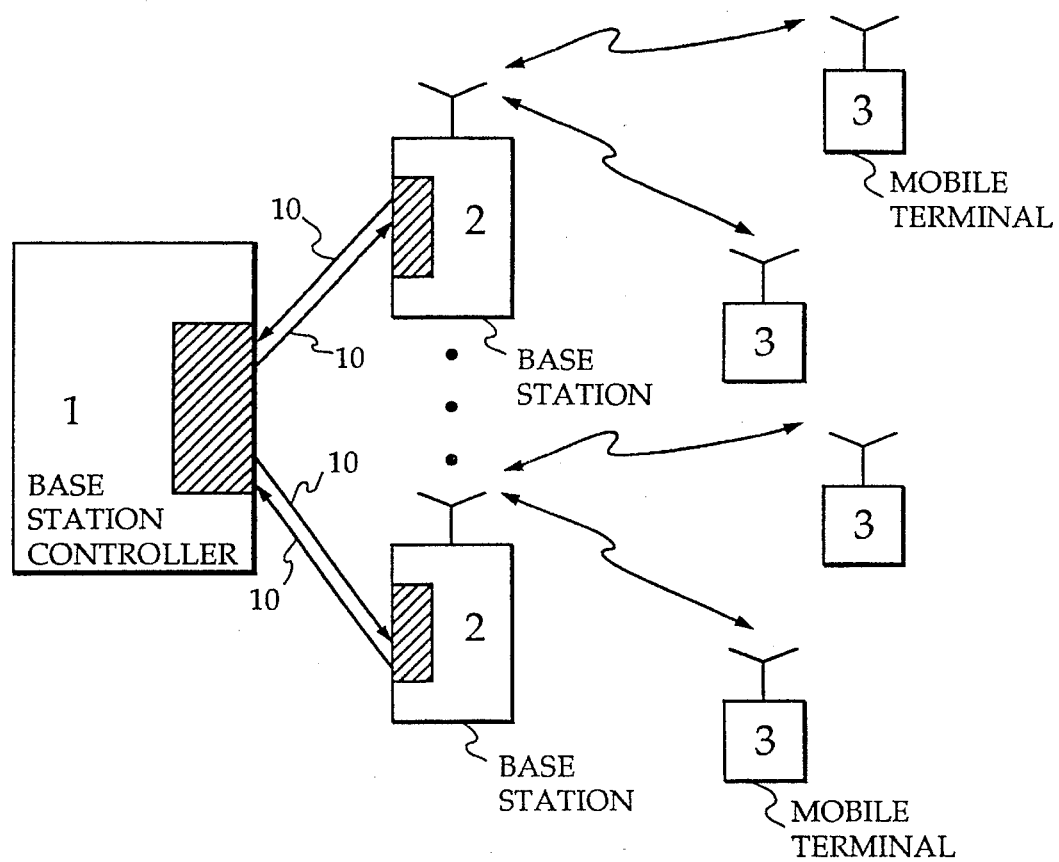
FIG. 1 shows the layout of a mobile communications system in which this invention is applied.
Figure 2:
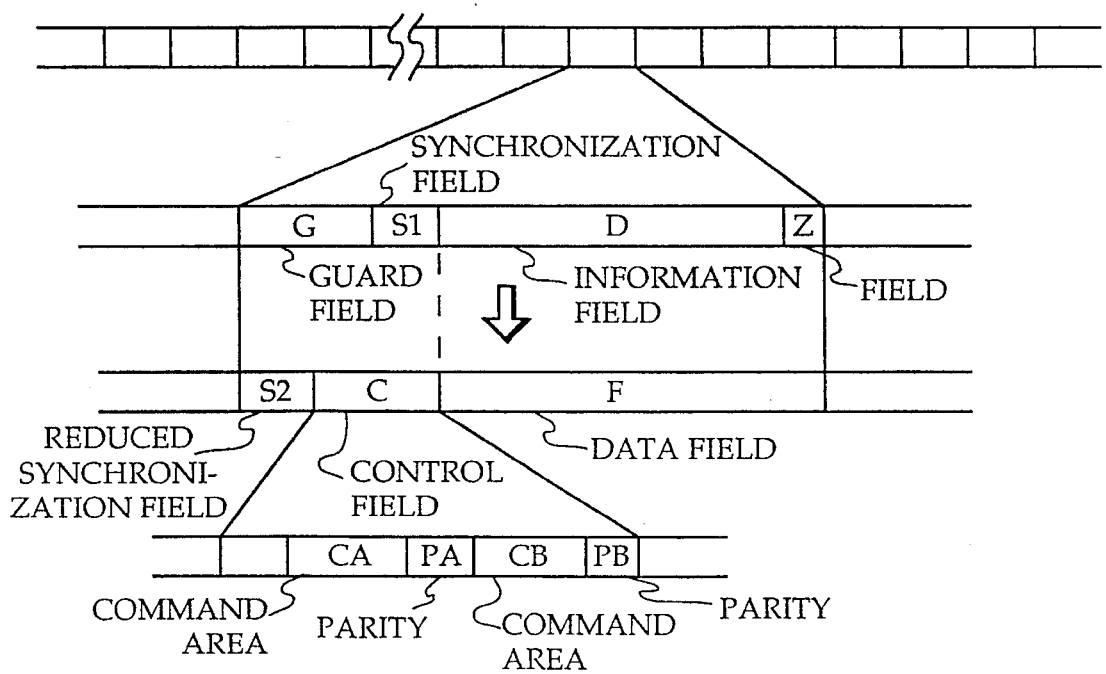
FIG. 2 shows the configuration of a frame used in a system like the aforementioned, in accordance with the invention.

The mobile communications system, as indicated in FIG. 1, is formed from a set of base stations 2, each one with a determined radio coverage to establish cordless communication with at least one mobile terminal 3 by means of the time division multiple access (TDMA) technique and using for this at least one radiofrequency channel, as is the case of the DECT system.

The base stations 2 are connected to a base station controller 1 by means of unidirectional transmission lines 10 over which the base stations 2 and their base station controller 1 interchange the necessary control information to set up a communications channel to put a base station 2 into contact with a mobile terminal 3 as well as the actual information transmitted over that channel.

To effect the communications between the base stations 2 and the mobile terminals 3 via radio, an air interface is defined that is precisely known from the DECT system specifications, in which each frame with a duration of 10 ms, consists of 24 normal bursts (of 480 bits), there normally being 12 of these for each direction of transmission.

Each of the normal bursts mentioned contains, as stated, 480 bits of which at least 56 (60 when the 4-bit Z field is not used) belong to a guard field G during which no signal is transmitted to prevent overlapping between consecutive bursts coming from distinct sources and which may also be at different distances, as well as to permit transmitter on and off times, frequency changes, etc. It also has a synchronisation field S1 of 32 bits which comprises clock synchronising bits and burst synchronising bits, and a data field D of 388 bits that contains the information being interchanged between the base station 2 and the mobile terminal 3.

In a similar way, half-length bursts of 240 bits and double-length bursts of 960 bits are defined, so that a normal burst can be replaced by two half-length bursts and two normal bursts can be grouped into one double-length burst. In both cases, these types of burst also have a guard field G and a synchronisation field S1, as well as the data field, which in these cases are of 148 and 868 bits respectively for the half-length and double-length bursts.

The links between the base stations 2 and their base station controller 1, formed by means of unidirectional transmission lines 10. are formed through a continuous interface according to the invention, the bit rate of which is the same as that of the air interface and that has a frame structure similar to the latter, employing for this two unidirectional transmission lines 10, one for each transmission direction (base stations to base station controller and base station controller to base stations). The frame structure for these interfaces, as already stated, is similar to that of the air interface but with suppression of the guard field G in each burst, because it is no longer necessary for this type of fixed link, and reducing the synchronisation field S1 of the air interface through the suppression of the bit synchronising part which is not required for continuous transmission, and reducing equally the number of bits in the burst synchronising part.

For each of the transmission directions in the unidirectional transmission lines 10, the frames have the same structure. This frame structure holds the same number of bursts, each constituted by a reduced synchronisation field S2 of 8 bits, that contains one fixed word and that serves to determine the beginning of each burst; a control field C of 64 bits per burst that is used to transmit the control and/or signalling information both in the direction of base station controller 1 to base stations 2 and in the direction of base stations 2 to base station controller 1; and the data field F that includes the same information as field D and field Z of a DECT burst.

Since the information contained in the control field C is of essential importance for system operation, this field is further protected by means of a protection mechanism against errors based on duplicating information and parity bits. For this, the control field C comprises two control subfields, each of 28 bits and identical to each other, containing respectively a command area CA and CB and a parity control bit PA and PB.

In the reception part of the burst in question, the following process takes place: first the parity of each control subfield is obtained and a check is made for coincidence of the respective parity bits PA and PB. If this coincidence is present and also both the command areas CA and CB are equal, then both command areas CA and CB are considered error-free. In the event that only one of the parity bits PA or PB is correct, then that command area CA or CB whose parity bit is correct is considered to be error-free and, finally, if neither of the parity bits PA or PB is correct, or if both are correct but the command areas CA and CB are not equal, then an error message is produced in order to indicate this situation.

What is claimed is:

1. In a burst communications system, a communications subsystem comprising a base station (2) and a base station controller (1) interconnected by a pair of unidirectional transmission lines, one for each direction of communication, wherein the base station (2) communicates by a radio link with a mobile terminal (3) using a time division multiple access protocol at a bit transmission rate, wherein a frame of said protocol includes a series of bursts each of which comprises a guard field (G), a synchronisation field (S1) and a radio link information field (D), and characterised in that the base station (2) and the base station controller (1) each have means by which to communicate, at a bit rate equal to the bit transmission rate for the radio link, in frames each of which is transmitted as a series of bursts that correspond one-for-one to the bursts of the radio link, and wherein each burst comprises an information field (F) that conveys information that is the same as is conveyed by the radio link information field (D), a reduced synchronisation field (S2) and a control field (C) to convey control and signalling information between the base station (2) and its base station controller (1).

2. A communications subsystem according to claim 1, characterised in that the communications subsystem has a clock with a clock frequency that is used for transmitting information in both directions between the base station controller (1) and the base station (2), and wherein said clock is a single master clock included in the base station controller (1).

3. A communications subsystem according to claim 1, characterised in that the control field (C) contains control and signalling information in both the direction from base station controller (1) to base station (2) and in the direction from base station (2) to its base station controller (1).

4. A communications subsystem according to claim 1, characterised in that the control field (C) includes a protective mechanism against errors in the unidirectional transmission lines (10).

5. A communications subsystem according to claim 4, characterised in that the control field (C) comprises at least two subfields of control information in which one subfield is a replica of the other and each includes a command area (CA, CB) that contains control information and a parity bit (PA, PB) in order to have error detection by means of parity detection, and wherein both the base station controller (1) and the base station (2) provide that in a transmission between the base station controller and the base station where one of these elements is the receiver and the other is the sender:

if both parity bits (PA, PB) and both command areas (CA, CB) of both subfields of the control information are equal, then the receiver accepts both control information subfields (CA, CB) as error-free, if only one of the parity bits (PA, PB) of either of the control subfields is correct, then the receiver accepts the control subfield with the correct parity bit as error-free, if both parity bits (PA, PB) are erroneous, then the receiver sends the sender an error message, and if both parity bits (PA, PB) are correct and the command areas (CA and CB) are not equal, then the receiver sends the sender an error message.

* * * * *

UNITED STATES PATENT AND TRADEMARK OFFICE
CERTIFICATE OF CORRECTION

PATENT NO. : 5,533,028
DATED : July 2, 1996
INVENTOR(S) : Carlos HITA DE LA TORRE, Francisco J. ESCRIHUELA, Francisco J. MARTINIZ GARCIA, Carlos HERNANDEZ BLANCO It is certified that error appears in the above-indentified patent and that said Letters Patent is hereby corrected as shown below:

On the Title page

Item [75] Inventors:

"Carlos H. Blanco" should be --Carlos Hernandez Blanco--.

Signed and Sealed this

Eighth Day of October, 1996

Attest:

BRUCE LEHMAN

*Attesting Officer*      Commissioner of Patents and Trademarks